(12) United States Patent
Malhan et al.

(10) Patent No.: US 11,919,239 B2
(45) Date of Patent: Mar. 5, 2024

(54) HYBRID FORMATION OF MULTI-LAYER PREPREG COMPOSITE SHEET LAYUP

(71) Applicant: UNIVERSITY OF SOUTHERN CALIFORNIA, Los Angeles, CA (US)

(72) Inventors: Rishi Malhan, Los Angeles, CA (US); Timotei Centea, Los Angeles, CA (US); Satyandra Gupta, Los Angeles, CA (US); Ariyan Kabir, Los Angeles, CA (US); Brual Shah, Los Angeles, CA (US); Aniruddha Shembekar, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 0 days.

(21) Appl. No.: 18/129,757

(22) Filed: Mar. 31, 2023

(65) Prior Publication Data

US 2023/0249409 A1    Aug. 10, 2023

Related U.S. Application Data

(62) Division of application No. 17/260,031, filed as application No. PCT/US2019/045416 on Aug. 7, 2019, now Pat. No. 11,628,624.

(Continued)

(51) Int. Cl.
*B29C 64/379* (2017.01)
*B25J 9/00* (2006.01)
(Continued)

(52) U.S. Cl.
CPC .......... *B29C 64/379* (2017.08); *B25J 9/0087* (2013.01); *B25J 11/005* (2013.01); *B29C 64/393* (2017.08);
(Continued)

(58) Field of Classification Search
CPC ... B29C 64/379; B29C 64/393; B29C 70/386; B29C 31/085; B29C 70/38; B25J 9/0087;
(Continued)

(56) References Cited

U.S. PATENT DOCUMENTS 7,128,869 B2 * 10/2006 Habisreitinger ...... B29C 70/467
264/102
8,936,695 B2    1/2015 Rotter et al.
(Continued)

FOREIGN PATENT DOCUMENTS

JP            6068646      1/2017
KR    10-2018-0057364      5/2018

OTHER PUBLICATIONS

International Search Report and Written Opinion of the International Searching Authority (dated Nov. 26, 2019) for Corresponding International PCT Patent Application No. PCT/US2019/045416, filed Aug. 7, 2019.

(Continued)

*Primary Examiner* — Nahida Sultana
(74) *Attorney, Agent, or Firm* — SNELL & WILMER LLP

(57) ABSTRACT

Methods, systems, and robots for multi-layer prepreg composite sheet layup. The robotic system may include a memory for storing a dataset including start and end point pairs of a mold of a 3D part that defines a layup sequence, a first robot or a first robot arm that is configured to conform a prepreg layer or sheet onto the mold of the 3D part, and a second robot or a second robot arm that is configured to hold or grasp the prepreg layer or sheet above the mold of the 3D part and stretch or relax the prepreg layer or sheet when the first robot or the first robot arm conforms the prepreg layer or sheet onto the mold. The robotic system may also include (Continued)

one or more processors connected to the first robot or the first robot arm and the second robot or the second robot arm.

9 Claims, 5 Drawing Sheets

Related U.S. Application Data

(60) Provisional application No. 62/715,497, filed on Aug. 7, 2018.

(51) Int. Cl.
| | | |
|---|---|---|
| *B25J 11/00* | (2006.01) | |
| *B29C 64/393* | (2017.01) | |
| *B29C 70/38* | (2006.01) | |
| *B33Y 10/00* | (2015.01) | |
| *B33Y 30/00* | (2015.01) | |
| *B33Y 50/02* | (2015.01) | |

(52) U.S. Cl.
CPC ............ *B29C 70/386* (2013.01); *B33Y 10/00* (2014.12); *B33Y 30/00* (2014.12); *B33Y 50/02* (2014.12)

(58) Field of Classification Search
CPC ....... B25J 11/005; B25J 9/1682; B33Y 10/00; B33Y 30/00; B33Y 50/02; G05B 2219/39157
See application file for complete search history.

(56) References Cited

U.S. PATENT DOCUMENTS

| | | | |
|---|---|---|---|
| 2011/0259515 A1* | 10/2011 | Rotter | B29C 70/541 |
| | | | 156/60 |
| 2016/0176123 A1 | 6/2016 | Pedigo et al. | |
| 2016/0325509 A1 | 11/2016 | Prebil et al. | |
| 2018/0147778 A1 | 5/2018 | Parkinson et al. | |
| 2020/0346419 A1* | 11/2020 | Rigamonti | B29C 37/001 |

OTHER PUBLICATIONS

Elkington, M et al. 'Automated layup of sheet prepregs on complex moulds' In: SAMPE Long Beach Conference, May 23-26, 2016 See pp. 1-17 and figures 1-11.

CAM USC Viterbi, 'Hybrid Cells for Multi-Layer Prepreg Composite Sheet Layup' [online], Sep. 20, 2017 [retrieved on Nov. 18, 2019]. Retrieved from the Internet: <URL: https://www.youtube.com/watch?v=yUAUaATqINw&t=63s> See summary and the whole video.

Malhan, Rishi K. et al. 'Hybrid Cells for Multi-Layer Prepreg Composite Sheet Layup' In: 2018 IEEE 14th International Conference on Automation Science and Engineering (CASE), Aug. 20-24, 2018 See pp. 1466-1472.

* cited by examiner

HYBRID FORMATION OF MULTI-LAYER PREPREG COMPOSITE SHEET LAYUP

CROSS-REFERENCE TO RELATED APPLICATIONS

This application is a divisional of U.S. patent application Ser. No. 17/260,031, titled "HYBRID FORMATION OF MULTI-LAYER PREPREG COMPOSITE SHEET LAYUP," filed on Jan. 13, 2021, which is a 35 U.S.C. § 371 application of PCT/US2019/45416 titled "HYBRID FORMATION OF MULTI-LAYER PREPREG COMPOSITE SHEET LAYUP," filed on Aug. 7, 2019, which claims priority to and the benefit of U.S. Provisional Patent Application No. 62/715,497 titled "HYBRID FORMATION OF MULTI-LAYER PREPREG COMPOSITE SHEET LAYUP," filed on Aug. 7, 2018, and the entire contents of each application is hereby incorporated by reference herein.

STATEMENT REGARDING GOVERNMENT RIGHTS

This invention was made with Government support under Contract No. 1634431 awarded by the National Science Foundation. The Government has certain rights in this invention.

BACKGROUND

Field

This specification relates to a system, method, robot and/or apparatus for performing multi-layer prepreg composite sheet layup.

Description of the Related Art

Robots are used in a wide range of industrial application areas like assembly, sheet lamination based additive manufacturing, robotic finishing and composite manufacturing. Composites are advanced structural materials consisting of fiber reinforcements with high specific strength and stiffness embedded within an engineered polymer matrix. High-performance composites are most often produced by laying down sheets of "prepreg," i.e. a sheet of carbon fiber reinforcements pre-mixed with an uncured, liquid polymer resin on a contoured mold. Multiple prepreg layers may be required to achieve a target stiffness and strength. After layup, the resulting laminate is cured using a prescribed heat and pressure cycle in an autoclave or oven to convert the resin from a fluid into a vitrified solid to maximize its properties.

Currently geometrically-complex parts are most often fabricated from prepreg sheets by human operators, using hand layup. Prepreg sheets offer advantages over fiber tows and tapes, including higher areal weights, multi-directional fiber orientations and consistent fiber alignment without gaps and overlaps. Layup is challenging because prepreg, a flat fiber-reinforced material that is relatively inextensible along the fiber direction, must be draped onto a complex mold geometry while retaining desired fiber orientations and avoiding damage. During hand layup, human laminators manually apply shear and compression loads to the woven prepreg in localized regions. This, however, is a time-intensive and challenging process with low-throughput, and result in part-to-part variability due to human factors and high labor costs.

Accordingly, there is a need to automate prepreg sheet layup on complex shaped molds.

SUMMARY

In general, one aspect of the subject matter described in this specification may be embodied in a method for the hybrid formation of multi-layer prepreg composite sheet layup. The method is used for automating prepreg sheet layup within a workspace to form a three-dimensional (3D) part. The method includes obtaining, by a processor, a dataset including start and end point pairs of a mold of the 3D part. The method includes generating, by the processor, a layup sequence based on the dataset. The method includes generating multiple trajectories for one or more movements of the first robot or the first robot arm based on the layup sequence. The method includes causing, by the processor, a second robot or a second robot arm to hold or grasp the prepreg layer or sheet a threshold distance above the mold or the 3D part. The method includes causing, by the processor, the first robot or the first robot arm to place or conform the prepreg layer or sheet to the mold of the 3D part.

These and other embodiments may optionally include one or more of the following features. The method may include determining, by the processor, an amount to stretch or relax the prepreg layer or sheet based on the multiple trajectories. The method may include causing, by the processor the second robot or the second robot arm, to stretch or relax the prepreg layer or sheet based on the amount to stretch or relax.

The method may include coordinating, by the processor, multiple movements for the first robot or the first robot arm with multiple movements for the second robot or the second robot arm based on the multiple trajectories. Coordinating the multiple movements may include determining one or more timings of when to release and hold the prepreg layer or sheet and one or more locations or positions to hold the prepreg layer or sheet.

The method may include determining a timing of a release and hold of the prepreg layer or sheet and a location or position. To generate the multiple trajectories, the method may include identifying at least one of a convex region or a concave region of a surface of the mold, and may include generating multiple draping trajectories and multiple dibbing trajectories in an ordered sequence based on the at least one of the convex region or the concave region. Generating the multiple trajectories may include generating joint motions or angles for the first robot or the first robot arm to move a tool to multiple locations or positions along the trajectory. The multiple trajectories may avoid any collisions between the first robot or the first robot arm with any other robot or robot arm. The multiple trajectories may also be based on one or more grasp locations.

The method may include determining or obtaining one or more parameters including at least one of a draping force, a dibbing force, a tool velocity, a temperature of airflow or a stiffness of the first robot or first robot arm. The method may include causing the first robot or the first robot arm to place or conform the prepreg layer or sheet to the mold of the 3D part based on the one or more process parameters. The dataset may include an orientation of the prepreg layer or sheet.

The method may include determining one or more grasp locations using a cost function and the layup sequence. The method may include causing the second robot or the second robot arm to hold or grasp the prepreg layer or sheet based on the one or more grasp locations.

In another aspect, the subject matter may be embodied in a robotic system. The robotic system includes a memory for storing a dataset including start and end point pairs of a mold of a 3D part that defines a layup sequence. The robotic system includes a first robot or a first robot arm that is configured to conform a prepreg layer or sheet onto the mold of the 3D part. The robotic system includes a second robot or a second robot arm that is configured to hold or grasp the prepreg layer or sheet above the mold of the 3D part and stretch or relax the prepreg layer or sheet when the first robot or the first robot arm conforms the prepreg layer or sheet onto the mold. The robotic system includes one or more processors connected to the first robot or the first robot arm and the second robot or the second robot arm. The one or more processors are configured to generate multiple trajectories based on the layup sequence. The one or more processors are configured to coordinate multiple collision free movements for the first robot or the first robot arm with multiple collision free movements of the second robot or the second robot arm based on the multiple trajectories. The one or more processors are configured to cause the first robot or the first robot arm to conform the prepreg layer or sheet onto the mold based on the multiple collision free movements for the first robot or the first robot arm. The one or more processors are configured to cause the second robot or the second robot arm to hold, grasp, stretch or relax the prepreg layer or sheet based on the multiple collision free movements for the second robot or the second robot arm.

In another aspect, the subject matter may be embodied in a robotic system. The robotic system includes a memory for storing a dataset including start and end point pairs of a mold of a 3D part that defines a layup sequence. The robotic system includes a first robot or a first robot arm that is configured to conform a prepreg layer or sheet onto the mold of the 3D part. The robotic system includes a second robot or a second robot arm that is configured to hold or grasp the prepreg layer or sheet above the mold of the 3D part when the first robot or the first robot arm conforms the prepreg layer or sheet onto the mold. The robotic system includes one or more processors connected to the first robot or the first robot arm and the second robot or the second robot arm. The one or more processors are configured to determine a location to place the 3D part within a workspace. The one or more processors are configured to determine one or more grasp locations for the second robot or the second robot arm to hold or grasp the prepreg layer or sheet. The one or more processors are configured to generate multiple trajectories based on the layup sequence. The one or more processors are configured to cause the first robot or the first robot arm to conform the prepreg layer or sheet onto the mold based on the multiple trajectories, and cause the second robot or the second robot arm to hold or grasp the prepreg layer or sheet based on the one or more grasp locations.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, robots, apparatuses and methods for the hybrid formation of multi-layer prepreg composite sheet layup. Particular embodiments of the subject matter described in this disclosure may be implemented to realize one or more of the following advantages. The robotic system automates prepreg sheet layup on complex-shaped molds using a hybrid cell, e.g., the robotic system may automate over 90% of the prepreg sheet layup process, which minimizes or eliminates human intervention and/or input. The robotic system generates collision-free trajectories and instructions for multiple robots. The robotic system performs repeated low-level tasks associated with the layup to minimize user intervention. This automates the prepreg process, which reduces the amount of human intensive labor involved in the conforming or placing of the prepreg layer to the part (hereinafter, the "conforming or placing" of the prepreg layer to the part may be referred to interchangeably as simply either "conforming" or "placing" of the prepreg layer to the part). By automating the prepreg sheet layup, the robotic system automates tedious tasks, minimizes the amount of time necessary to conform or place the prepreg layer, increases the throughout, and reduces the amount of variability. This reduces layup-induced defects (e.g. wrinkling, bridging over concave corners, fiber misalignment, or local damage caused by excessive application of force) and the overall time to perform the prepreg layup.

Other benefits and advantages include the capability to perform trajectory planning for multiple robots to simultaneously operate to perform the prepreg sheet layup. This prevents the multiple robots from colliding with each other and affecting the prepreg sheet layup. Moreover, the robotic system coordinates the timing and release of the grasping of the prepreg layer with the movements of the different robots so that the prepreg layer or sheet may be conformed to concave and/or convex regions of the part.

Additionally, the robotic system may perform prepreg sheet layup without pre-shearing, which shows that a heating device may be incorporated into an end effector and achieve adequate shearing using impedance motion control and collaboration between multiple robots. Moreover, the robotic system controls the robots to change holding positions and trajectories during the entire process to account for the non-linearity and differing shape of the prepreg layer.

Figure 1:
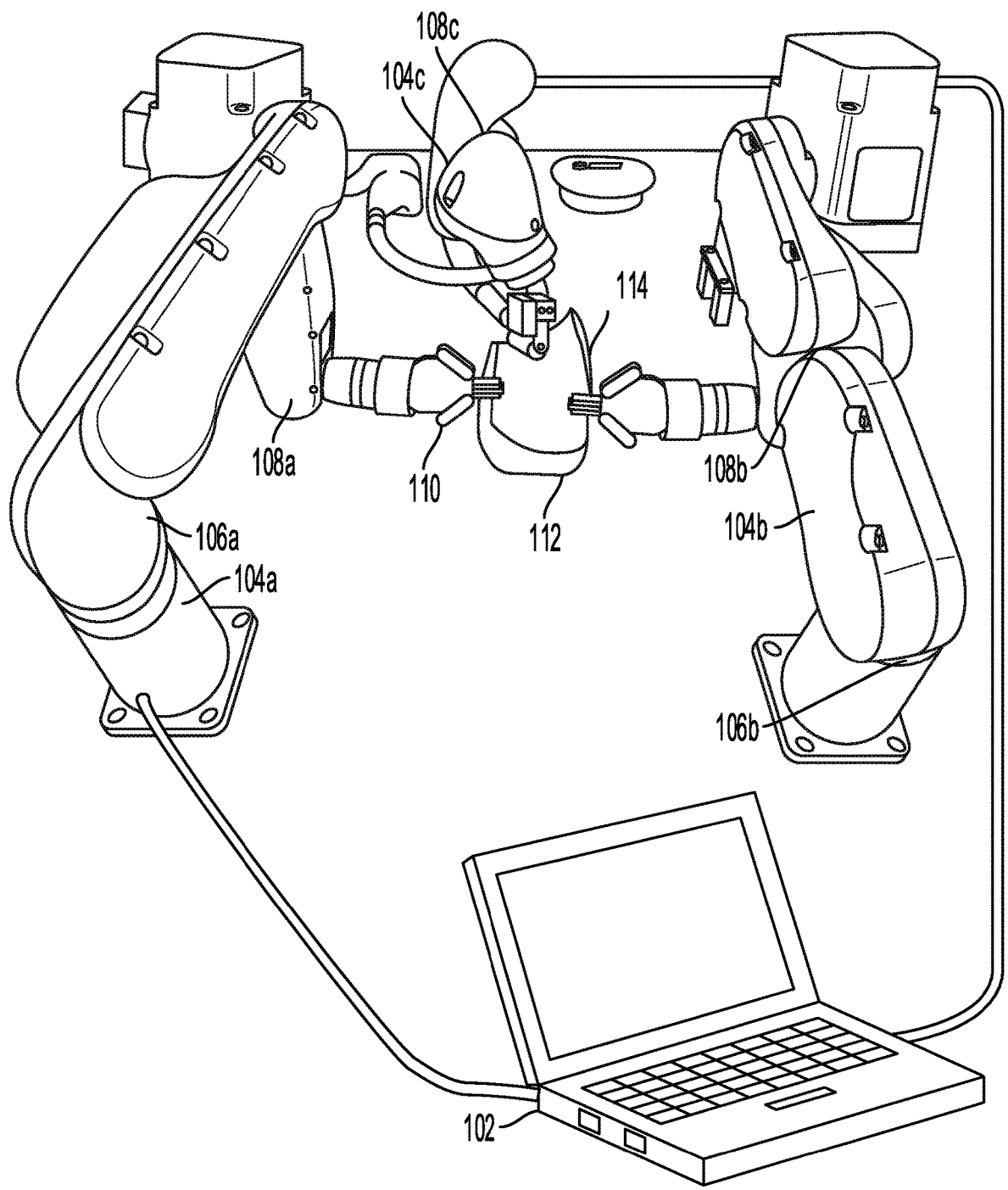
FIG. 1 shows an example robotic conforming system according to an aspect of the invention.

FIG. 1 shows a robotic conforming system ("robotic system") 100. The robotic system 100 determines various trajectories to move and coordinate one or more robots or robot arms (hereinafter, "robots") 104a-c to place or conform the prepreg layer or sheet ("prepreg layer") 114 to the mold of the three-dimensional (3D) part ("part") 112 and/or hold the prepreg layer 114. The robotic system 100 may place or conform the prepreg layer 114 using one robot, such as the robot 104c, and hold the prepreg layer 114 using another robot, such as the robot 104b.

Figure 2:
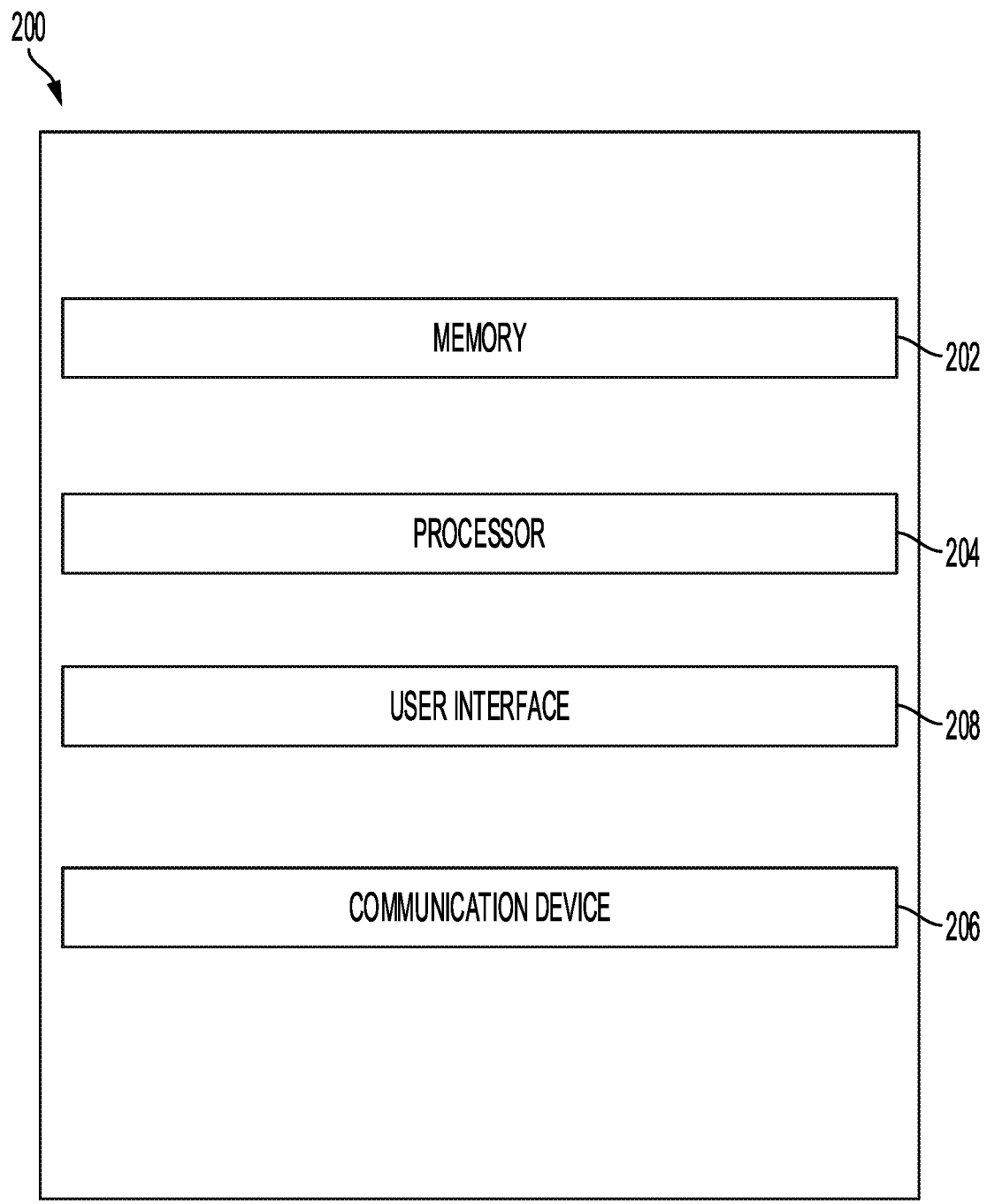
FIG. 2 shows an example block diagram of the computing device of the robotic conforming system of FIG. 1 according to an aspect of the invention.

The robotic system 100 includes a computing device 102 and one or more robots 104a-c. The computing device 102 has one or more processors 202, a memory 204, a communication device 206 and a user interface 208, as shown in FIG. 2 for example. The one or more robots 104a-c may include one or more motors 106a-b, one or more actuators 108a-c, and/or an end-effector (or "tool") 110. The robotic platform 100 may be connected to or coupled with a power source (not shown) that provides power to the one or more motors 106a-b and/or the one or more actuators 108a-c.

The one or more processors 202 may be implemented as a single processor or as multiple processors. The processor 202 may be electrically coupled to some or all of the components of the robotic system 100. The processor 202 may be coupled the memory 204, the communication device 206 and/or the user interface 208. The one or more processors 202 may be coupled to the components of the one or more robots 104a-c including the one or more motors 106a-b, one or more actuators 108a-c and/or the tool 110. The one or more processors 202 implement instructions stored in the memory 204 to identify or determine the trajectory and/or movements of one or more robots 104a-c that provide access to the tool 110 to conform the prepreg layer 114. Moreover, the one or more processors 202 control the various components of the one or more robots 104a-c to grasp or hold the prepreg layer 114 and/or position or orient the tool 110 to conform the prepreg layer 114 to the part 112. The one or more processor 202 may position, orient or otherwise move the one or more motors 106a-b and/or the one or more actuators 108a-c to position or orient the tool 110.

The memory 204 may be coupled to the one or more processors 202. The memory 204 may store instructions to execute on the one or more processors 202 and may include one or more of a RAM or other volatile or non-volatile memory. The memory 204 may be a non-transitory memory or a data storage device, such as a hard disk drive, a solid-state disk drive, a hybrid disk drive, or other appropriate data storage, and may further store machine-readable instructions, which may be loaded and executed by the one or more processors 202. The memory 204 may store the setup plan or execute the trajectory plan to conform the prepreg layer 114 to the part 112.

The computing device 102 may have a communication device 206 and/or a user interface 208. The communication device 206 communicates with other components, such as the one or more robots 104a-c. The communication device 206 may have a communication port or channel, which is wireless, such as one or more of a Wi-Fi unit, a Bluetooth® unit, a radio frequency identification (RFID) tag or reader, or a cellular network unit for accessing a cellular network (such as 3G, 4G or 5G), or which is wired, such as Ethernet. The communication device 206 may transmit data and receive data from the one or more robots 104a-c to control the one or more robots 104a-c.

The computing device 102 may have a user interface 208. The robotic platform 100 may display one or more notifications on the user interface 208 and/or may receive user settings or control information to control the one or more robots 104a-c. The user interface 208 may include an input/output device that receives user input from a user interface element, a button, a dial, a microphone, a keyboard, or a touch screen. The user interface 208 may provide an output to an output device, such as a display, a speaker, an audio and/or visual indicator, or a refreshable braille display.

The robotic system 100 has one or more robots 104a-c. The one or more robots 104a-c may be a single robot or multiple robots, which each independently operate. The one or more robots 104a-c may have one or more motors 106a-b, one or more actuators 108a-c and/or a tool 110. The one or more motors 106a-b and the one or more actuators 108a-c may be controlled via a data signal from the one or more processors 202. The one or more motors 106a-b and the one or more actuators 108a-c may control a joint of a robot and may be used to actuate movements, giving or allowing the robot to access various precise angles. The one or more motors 106a-b may be connected to a tool 110, which grasps, fastens, clasps or otherwise holds onto a part 112 in a position and/or orientation relative to the tool 110 within a workspace. The tool 110 may be positioned at an end of one of the robots 104a-c, such as the robot 104a.

On another end of the robot 104a-c or on an end of another robot 104b, the robot 104a-c may have another tool 110. The robot 104a-c uses the tool 110 to fabricate, finish, manipulate or otherwise modify, form and/or otherwise interact with the part 112. For example, the tool 110 may be a roller, a draping tool, a dibbing tool or a nozzle to blow air.

On a third end of the robot 104a-c or on an end of a third robot 104c, the robot 104a-c may have another tool 110. For example, the first robot 104a may hold or grasp the part 112, the second robot 104b may conform the prepreg layer to the part 112 and the third robot 104c may have a laser and scan using the laser an image of the prepreg layer onto the part 112. In another example, the first robot 104a and the second robot 104b may hold or grasp the part 112 and the third robot 104c may place or conform the prepreg layer onto the part 112. The tool 110 may be customized based on a geometry of the part and characteristics of the prepreg layer.

During layup, draping tools are used to conform the prepreg layer onto different surface geometries. The roller, on the other hand, may be chosen as a draping tool because it can apply pressure without slipping and orientation can be changed without affecting contact and shear forces due to its circular geometry. The dibber is a sharply curved tool approximating a human finger and useful for tight concave corners. Silicone with different shore hardnesses, e.g., a shore hardness of 30a, may be used for the roller and the dibber to achieve the desired stiffness and avoid adhesion with prepreg.

The roller may have a radius that is limited by the part geometry and a minimum curvature being draped. A desired stiffness may limit the roller material. Stiffer rollers can fail to conform to tight curvatures requiring more force to achieve the desired contact patch. The roller width may be restricted by the geometry of the mold with narrower rollers preferable for tight corners. In some implementations, the tool 110 may be a nozzle, which blows air and may heat the part 112 to apply shear during conformation and deforms the prepreg layer in desired regions rather than globally, allowing the prepreg layer 114 to conform to local contoured surfaces. The part 112 may be an object where the fabrication, modification, manipulation or interaction occurs.

Figure 3:
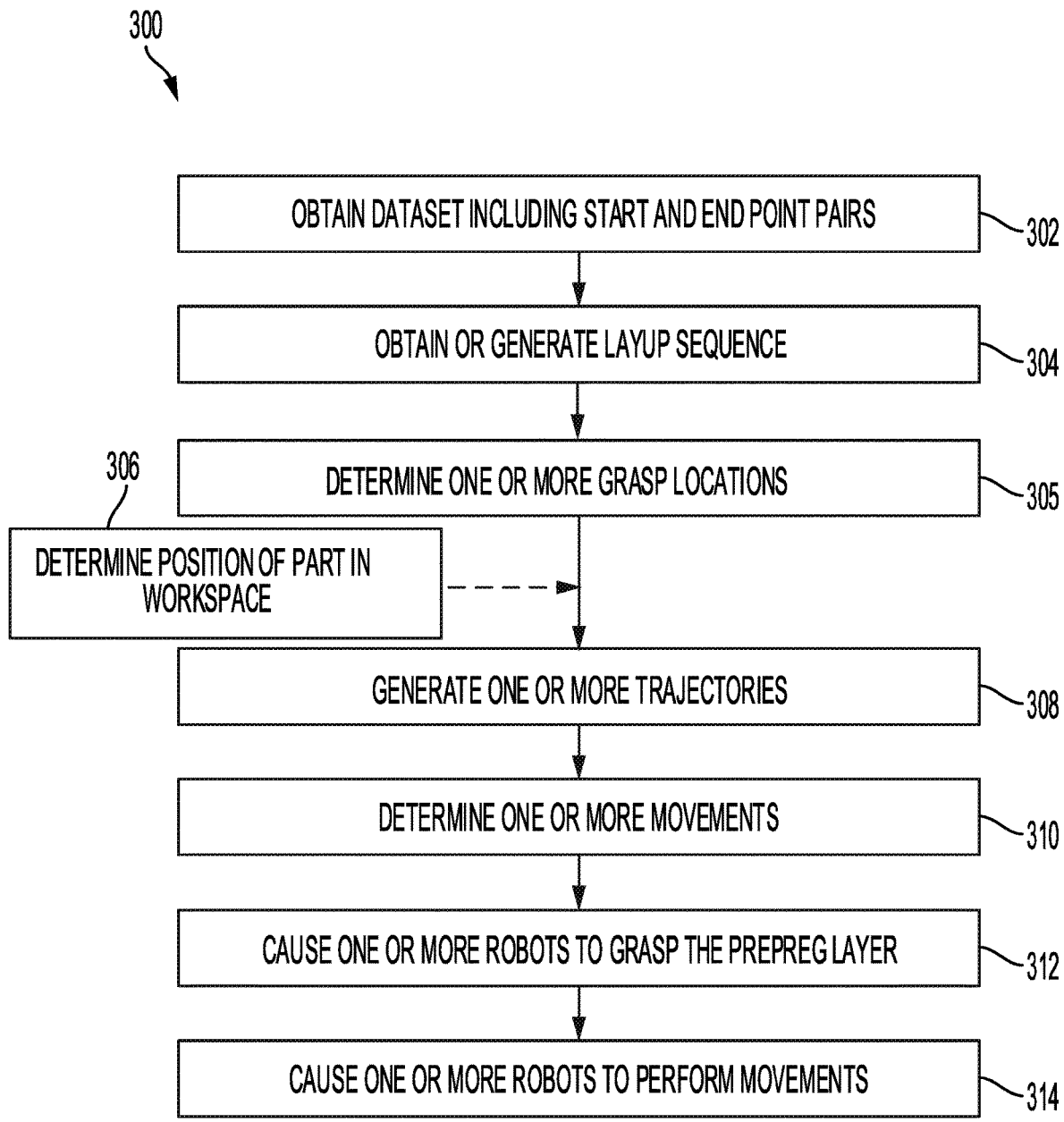
FIG. 3 is a flow diagram of an example process of forming a multi-layer prepreg composite sheet layup using the robotic conforming system of FIG. 1 according to an aspect of the invention.

FIG. 3 is a flow diagram of an example process 300 of setting up and planning the positioning and orientation of the part. One or more computers or one or more data processing apparatuses, for example, the one or more processors 202 of the computing device 102 of the robotic platform 100 of FIG. 1, appropriately programmed, may implement the process 300.

The robotic system 100 obtains a dataset including start and end point pairs of a mold of the part 110 (302). The robotic system 100 may obtain the dataset from the memory 204. The robotic system 100 may have received user input from the user interface 208 from one or more users that included the dataset. One or more users may have selected the mold design and performed material selection prior to entering the dataset into the robotic system 100. The one or more users may review draping simulations to determine the sheet geometries required for draping, which allow the one or more users to assess start locations and layup sequences. The one or more users then may conduct a limited set of manual trials with different placement strategies and record the sequence of start and end point pairs for each successful layup strategy into the dataset. The robotic system 100 receives the dataset including the start and end point pairs of the mold of the part 110 via user input. The dataset forms the basis of a generic sequence of paths on the mold of the part 110, but may not consider the non-linear behavior of the prepreg layer 114. The dataset may also include an orientation of the prepreg layer 114.

The robotic system 100 obtains or generates a layup sequence (304). The robotic system 100 obtains or generates the layup sequence for the one or more robots 104a-c based on the dataset. The robotic system 100 may receive the layup sequence from user input, e.g., from user input on a Computer-Aided Design (CAD) model that denotes the start and end points for each layup trajectory that the one or more robots 104a-c need to carry out, or for the grasping points of the one or more robots 104a-c. The layup sequence connects the start and end points along with any points in between to form the one or more paths or trajectories for the one or more robots 104a-c.

Once the layup sequence is generated or obtained, the robotic system 100 determines one or more grasp locations (305). The one or more grasp locations may be based on the layup sequence and the location of the part 112 within the workspace. The robotic system 100 determines a grasp location for each of the one or more robots 104a-c that will hold the prepreg layer 114. Moreover, the one or more grasp locations may position the prepreg layer 114 a threshold distance above the part 112 to ensure that defects in the conformance of the prepreg layer 114 to the part 112 is minimized or eliminated. The one or more grasp locations may be positioned on an edge of the prepreg layer 114. The one or more robots 104a-c need to manipulate the prepreg layer 114 such that there is no contact between the prepreg layer 114 and the part 112 except the point at which the other robot 104a-c that is conforming the prepreg layer 114 is applying a force. The tool 110 of the one or more robots 104a-c that grip the prepreg layer 114 may be aligned with the normal of the surface at the one or more grasping points.

Once the layup sequence is given, the robotic system 100 may obtain a cost function to be used to determine the one or more grasp locations. The cost function may represent a state of the sheet. For example, the cost function may represent the amount of energy necessary to hold or grasp the prepreg layer 114 above the part 112, the amount of defects including an amount of bending or wrinkles within the prepreg layer 114 at the one or more grasp locations, the amount of redundant movement or re-grasp of the one or more robots 104a-c along the edges, and/or the number of collisions among the trajectories of the one or more robots 104a-c and the prepreg layer 114.

The robotic system 100 may use the cost function to determine the minimum number of grasp locations and the locations of the one or more grasp locations for the one or more robots 104a-c to conform or place the prepreg layer 114 onto the mold of the part 112. The robotic system 100 determines the one or more grasp locations and the sequence of the one or more grasp locations of the one or more robots 104a-b based on the cost, which is determined using the cost function of the different sequences of grasp locations. The robotic system 100 selects the sequence and the one or more grasp locations that minimizes the overall cost to conform or place the prepreg layer onto the mold of the part 112.

The one or more grasp locations identify where one or more of the robots 104a-c, such as the robots 104a-b, grasp the prepreg layer 114 to conform or place the prepreg layer 114 on the mold of the part 112. The cost function minimizes the amount of energy required to conform or place the prepreg layer 114 on the mold of the part 112 along one or more trajectories. Moreover, the cost function minimizes redundancy of any movement of the one or more other robots 104a-c and the amount of time to conform the prepreg layer, while preventing any collisions among the prepreg layer 114, the part 112, and/or the one or more robots 104a-c. The robotic system 100 may select the optimum location to hold the prepreg layer 114 based on kinematic constraints of the one or more robots 104a-b, collision avoidance and the geometry of the prepreg layer 114. A hybrid of sampling, optimization and search-based algorithms may be used to find the optimal location. The robotic system 100 may perform iterations of simulations of the one or more trajectories using a flexible collision library to detect collisions.

The robotic system 100 may determine a position for the part 112 within the robot workspace (306). The position may be within a workspace of the one or more robots 104a-c and may be positioned such that the reachability of the one or more robots 104a-c is maximized, and the overall operation time is minimized. This allows the robotic system 100 to generate a trajectory for the one or more robots 104a-c that satisfies one or more parameters, such as velocity or force. The robotic system 100 may display the location to the user so that the user moves the part 112 to the location within the workspace. In some implementations, a fourth robot or one of the one or more robots 104a-c may move the part 112 to the relative location or the position determined by the robotic system 100.

The robotic system 100 generates the one or more trajectories of the one or more movements of the one or more robots 104a-c (308). The one or more trajectories of the one or more movements may include joint motions or angles for each of the one or more robots 104a-b to move the tool 110 to various locations or positions along the trajectory. The one or more trajectories may be based on the one or more grasp locations. When the grasp locations change or are otherwise different, the robotic system 100 may need to formulate one or more different trajectories for the one or more robots 104a-c, such as the robot 104c, to conform the prepreg layer 114 to the curvature of the mold of the part 112.

The robotic system 100 may use motion planning algorithms and/or receive user input to generate the robotic instructions for the one or more trajectories of the one or more movements of the one or more robots 104a-c. The different movements may be defined to avoid collisions with another robot 104a-c and include grasping or holding the part 112 at one or more locations and/or executing draping, dibbing or other conforming motions to conform the prepreg layer 114 to the mold of the part 110. The one or more robots 104a-b may perform shearing of the prepreg layer 114 while in motion and/or grasp and move the prepreg layer 114 to avoid undesired contact between the prepreg layer 114 and the mold of the part 112.

As part of generating the one or more trajectories, the robotic system 100 may identify different regions of the part 112, such as a convex region and/or a concave region of a surface of the mold of the part 110. The robotic system 100 identifies the one or more concave and convex regions on the surface and generates dibbing and draping paths, respectively. Neighbors of a specific face on the surface where the prepreg layer 114 is consolidated may be computed for regions having a change in gradient and the intersection of the surface normal around the face may represent concave regions. If the normal do not intersect, then it is a convex region.

The robotic system 100 may generate one or more draping trajectories and/or one or more dibbing trajectories along with the sequence of each of the one or more trajectories based on the different regions of the part 112, which the robotic system 100 wants to conform or place the prepreg layer 114 onto the mold of the part 112. The robotic system 100 may generate a geodesic curve on the target surface for each start-end point pair. The one or more geodesic curves are the shortest paths on free-form parametric surfaces. Each geodesic curve constitutes a sequence of way-points. The robotic system 100 defines collision-free configurations of the robots 104a-c along these points. The collision-free trajectories between successive geodesic paths are generated by an algorithm. A roller may be chosen as the tool 110 because the roller has a circular geometry and constrains only 5 degrees of freedom in the pose of the robot 104a-c. The sixth degree of freedom or angle may be made by the surface normal of the roller and the part 112 can be set as variable. For planning in a space with lesser degrees of freedom, the robotic system 100 may search to determine a trajectory which offers continuous motion over each of the paths. Each depth in the graph computed corresponds to all the valid collision-free configurations of the robots 104a-c at that way-point. The robotic system 100 may use a search-based algorithm to search through the tree for different initial configurations of the one or more robots 104a-c at the start point and use the normal of the angle change in each joint as the cost to go to a new state.

Moreover, the robotic system 100 may generate one or more repositioning trajectories for the one or more robots 104a-c. Once the one or more draping trajectories and/or the one or more dibbing trajectories are generated, the robotic system 100 may generate corresponding moving and shearing trajectories for the one or more robots 104a-c that are holding the prepreg layer 114.

The robotic system 100 may determine one or more movements of the one or more robots 104a-c based on the one or more trajectories (310). The one or more movements may include movement of the one or more motors 106a-b and/or the one or more actuators 108a-c to perform a stretching or relaxing movement that stretches or relaxes the prepreg layer 114 or other movement. The one or more movements may be based on the one or more trajectories for the one or more robots 104a-c. The one or more trajectories may also include an amount to stretch or relax the prepreg layer. In some implementations, the one or more movements include one or more timings of when to release and/or hold the prepreg layer and the one or more locations or positions to hold the prepreg layer.

The robotic system 100 may coordinate two or more movements. The coordination may be based on the one or more trajectories and ensure that the two or more movements do not cause the one or more robots 104a-c to collide with each other or with the prepreg layer 114 and/or the part 112. For example, the two or more movements may include instructions of a timing of a release and/or hold of the prepreg layer 114 along with the location or position to release and/or hold the prepreg layer 114.

The robotic system 100 uses one or more robots 104a-c to hold or grasp the prepreg layer 114 (312). The robotic system 100 may control the one or more robots 104a-c using the one or more movements and cause the one or more robots 104a-c, such as the robot 104a, to hold or grasp the prepreg layer 114 or sheet a threshold distance above the mold of the part 112 at the one or more grasp locations. The robot 104a may grasp the prepreg layer 114 using one or more motors 106a-b and/or one or more actuators 108a-c to grasp the prepreg layer 114 the threshold distance about the part 112.

The robotic system 100 uses another robot of the one or more robots 104a-c to place or conform the prepreg layer 114 to the mold of the part 112 while moving according to the one or more movements (314). The robotic system 100 may cause the two or more robots 104a-b to work together and in collaboration, simultaneously and/or in conjunction with one another, based on the robotic instructions that include the one or more trajectories. The one or more trajectories may ensure that the two or more robots do not collide with one another. The other robot 104b, which may be used to conform the prepreg layer 114, may conform the prepreg layer 114 to the surface and also shear the prepreg layer 114 while in motion. When the conforming robot presses or places the prepreg layer 114 onto the part 112, the robotic system 100 may simultaneously and/or continuously heat the prepreg layer 114 to conform to the part 112, e.g., by blowing warm air through a nozzle.

Figure 4:
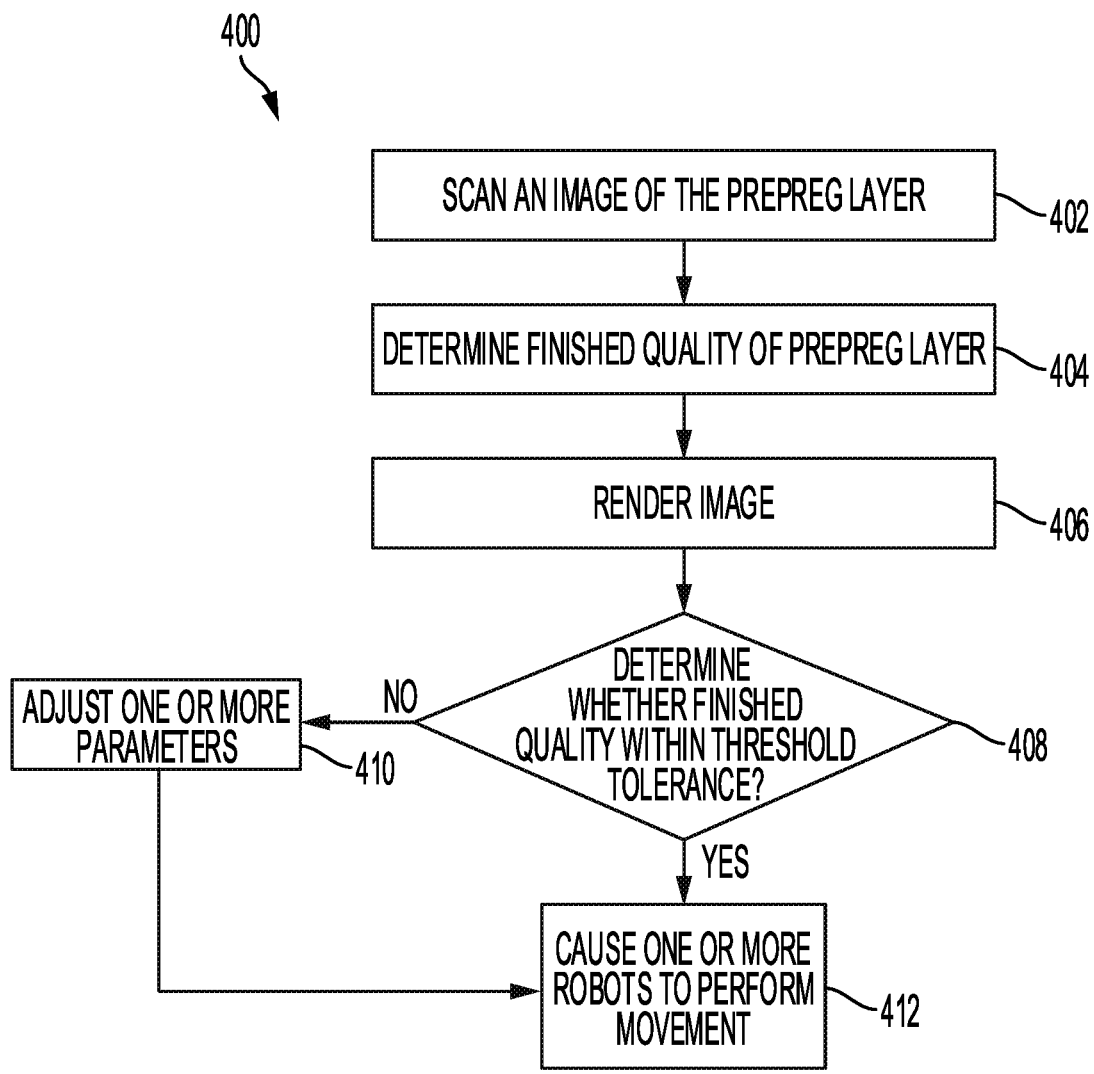
FIG. 4 is a flow diagram of an example process for selecting one or more processor parameters to achieve one or more finished surface qualities using the robotic conforming system of FIG. 1 according to an aspect of the invention.

The robotic system 100 may conform the prepreg layer 114 onto the part 112 based on one or more parameters, such as velocity, speed, pressure or other parameter that results in a fiber alignment, resin quality or conformity of the prepreg layer 114 on the part 112. The one or more parameters affect the performance of the layup. The initial parameter values of the one or more parameters lie within bounds, which are limited by the layup setup and the physical constraints of the one or more robots 104a-c. For example, under impedance control, the minimum draping force necessary for a layup may be 10 N, below which conformity degrades. A higher force, such as 20 N, may be required for a double curvature compared to a flat or a single curvature. Corners, on the other hand, may require a draping force of 30 N. The different draping forces, different velocities of the tool 110, different temperatures and/or other parameters may affect one or more finished surface qualities. The robotic system 100 uses the tool 110 on the one or more robots 104a-c to conform the prepreg layer 114 onto the part 112 while moving the one or more robots 104a-c along their corresponding trajectories. FIG. 4 further describes the process of determining the one or more parameters that result in the specific qualities, such as the fiber alignment, resin quality or conformity of the prepreg layer 114 on the part 112.

FIG. 4 is a flow diagram of an example process 400 for determining parameters for the tool 110 of the robotic system 100 to optimize finishing of the part 112. One or more computers or one or more data processing apparatuses, for example, the one or more processors 202 of the computing device 102 of the robotic system 100 of FIG. 1, appropriately programmed, may implement the process 400.

Figure 5A:
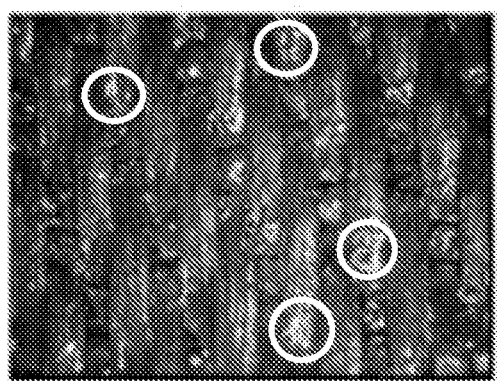
FIGS. 5A-5D show examples of images taken by a digital microscope of different surfaces after the prepreg layer has been conformed or placed onto the mold or the part according to an aspect of the invention.
Figure 5B:
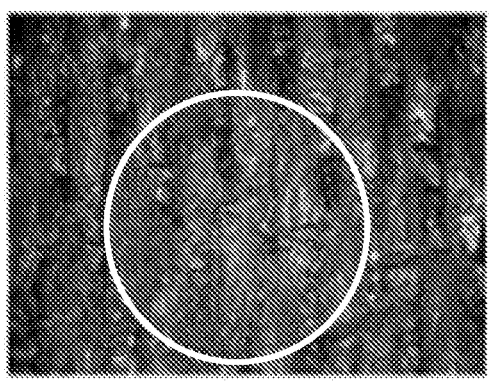
Figure 5C:
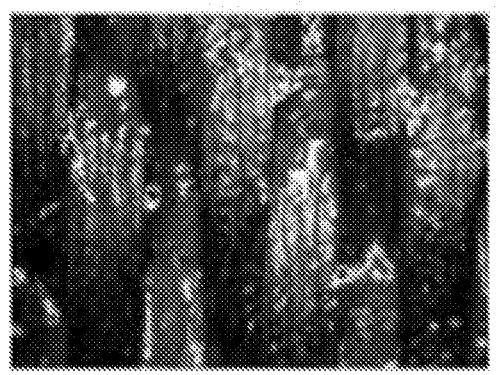
Figure 5D:
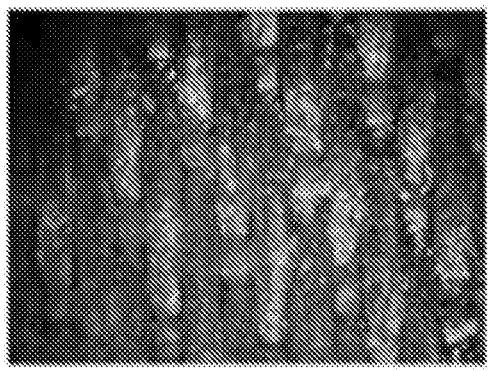

Once the robotic system 100 has conformed, placed or otherwise formed a prepreg layer 114 onto the part 112, the robotic system 100 may use a robot 104*a-c* to scan an image of the prepreg layer 114 on the part 112 (402). The robot 104*a-c* may use a tool 110, such as a laser, to scan the image of the prepreg layer 114. The robotic system 100 scans the prepreg layer 114 that is on the part 112 to determine one or more finished surface qualities of the prepreg layer 114. The one or more finished surface qualities may include resin quality, conformity of the prepreg layer 114 on the mold of the part 112 and/or fiber alignment. FIGS. 5A-5D show the different surfaces captured by a digital microscope. For example, FIG. 5A shows the original surface with resin areas circled. FIG. 5B shows a resin devoid surface with dry and damaged fibers circled. FIG. 5C shows a surface after the layup by a roller using the robotic system 100, and FIG. 5D shows the surface after a hand-layup.

Once the robotic system 100 scans the image of the prepreg layer 114 on the part 112, the robotic system 100 determines the values of the one or more finished surface qualities of the prepreg layer 114 (404). The robotic system 100 may determine the values of the one or more finished surface qualities based on the image that was captured or scanned. For example, the robotic system 100 may determine the resin quality, the conformity and/or the fiber alignment. For instance, at high pressures and temperatures, applied contact displacement, parallel to the surface, can disturb the resin distribution by displacing resin which decreases resin quality. Moreover, the layup should produce excellent conformity of the prepreg layer 114 to the mold surface without voids (air entrapped) and wrinkles, which affects the overall conformity of the prepreg layer 114 to the mold. Additionally, when one or more parameters are incorrect, the draping trajectories and/or grasping trajectories can lead to fiber misalignment relative to neighboring tows and the global mold orientation may affect overall fiber alignment. Fiber angle deviations are permissible up to a certain tolerance because the deviations can be unavoidable during shearing. However, high deviations will cause wrinkling.

The robotic system 100 may use a laser coordinate measurement machine to scan the prepreg layer 114 on the part 112 to determine the conformity, for example. In another example, the robotic system 100 may use another device to determine the fiber alignment of uncured layups. The robotic system 100 may detect or determine the average fiber distribution in a region and detect areas where alignment changes with respect to the regional average. In another example, the robotic system 100 may detect resin dislocation to determine resin quality.

The robotic system 100 may display the image so that a user may also analyze the image (406). The robotic system 100 may determine whether the one or more finished surface qualities are within one or more threshold tolerances (408). Each finished surface quality may be associated with a threshold tolerance. The one or more threshold tolerances may have been previously inputted via the user interface 208 or may be pre-configured.

If the one or more finished surface qualities exceed the corresponding threshold tolerance, the robotic system 100 may adjust one or more parameters (410). The one or more parameters may be for a movement or placement of the one or more robots 104*a-c*. The one or more parameters may include a draping force, a dibbing force, a tool velocity, a temperature of airflow or a stiffness of the one or more robots 104*a-c*. Once the one or more parameters are adjusted or when the one or more threshold tolerance are not exceeded, the robotic system 100 performs one or more movements based on the parameters (412). That is, the robotic system 100 continues to perform the one or more movements based on the parameters, and once those one or more movements are completed, the robotic system 100 rescans an image and reanalyzes the image for the one or more finished surface qualities to further adjust the one or more parameters.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A robotic system, comprising:
    a memory for storing a dataset including start and end point pairs of a mold of a 3D part that defines a layup sequence;
    a first robot or a first robot arm that is configured to conform a prepreg layer or sheet onto the mold of the 3D part;
    a second robot or a second robot arm that is configured to hold or grasp the prepreg layer or sheet above the mold of the 3D part and stretch or relax the prepreg layer or sheet when the first robot or the first robot arm conforms the prepreg layer or sheet onto the mold; and
    one or more processors connected to the first robot or the first robot arm and the second robot or the second robot arm and configured to:
        generate a plurality of trajectories based on the layup sequence,
        coordinate a plurality of collision free movements for the first robot or the first robot arm with a plurality of collision free movements of the second robot or the second robot arm based on the plurality of trajectories,
        cause the first robot or the first robot arm to conform the prepreg layer or sheet onto the mold based on the plurality of collision free movements for the first robot or the first robot arm, and
        cause the second robot or the second robot arm to hold, grasp, stretch or relax the prepreg layer or sheet based on the plurality of collision free movements for the second robot or the second robot arm.

2. The robot system of claim 1, further comprising:
    a third robot or a third robot arm having a laser and configured to scan, using the laser, an image of the prepreg layer or sheet on the mold; and
    a display for displaying the image of the prepreg layer or sheet, the image showing a fiber alignment, a resin quality or a conformity of the prepreg layer or sheet on the mold;
    wherein the one or more processors are configured to:
        analyze the image to determine the fiber alignment, the resin quality or the conformity of the prepreg layer or sheet on the mold, and
        render the image on the display.

3. The robot system of claim 2, wherein the one or more processors are configured to cause the first robot or the first robot arm to conform the prepreg layer or sheet onto the mold further based on one or more parameters that result in the fiber alignment, the resin quality or the conformity of the prepreg layer or sheet on the mold.

4. The robot system of claim 3, wherein the one or more parameters include at least one of a draping force, a dibbing force, a tool velocity, a temperature of airflow or a stiffness of the first robot or the first robot arm, wherein processor is configured to move the first robot or the first robot arm based on the one or more process parameters.

5. The robotic system of claim 1, wherein the first robot or the first robot arm is a conforming robot or robot arm and the second robot or the second robot arm is a grasping robot or robot arm, wherein the conforming robot or robot arm is configured to press or place the prepreg layer or sheet onto the 3D part based on the plurality of trajectories and heat the prepreg layer or sheet to conform to the 3D part, and the grasping robot or robot arm is configured to hold the prepreg layer or sheet a threshold distance above the 3D part.

6. The robotic system of claim 1, wherein the second robot or the second robot arm holds or grasps the prepreg layer or sheet at a point within a first area or region of the prepreg layer or sheet and outside a second area or region that encompasses the plurality of trajectories.

7. The robotic system of claim 1, wherein the first robot or the first robot arm has one or more tools including at least one of a roller, a draping tool, a dibbing tool or a nozzle to blow air.

8. A robotic system, comprising:
a memory for storing a dataset including start and end point pairs of a mold of a 3D part that defines a layup sequence;
a first robot or a first robot arm that is configured to conform a prepreg layer or sheet onto the mold of the 3D part;
a second robot or a second robot arm that is configured to hold or grasp the prepreg layer or sheet above the mold of the 3D part when the first robot or the first robot arm conforms the prepreg layer or sheet onto the mold; and
one or more processors connected to the first robot or the first robot arm and the second robot or the second robot arm and configured to:
determine a location to place the 3D part within a workspace,
determine one or more grasp locations for the second robot or the second robot art to hold or grasp the prepreg layer or sheet,
generate a plurality of trajectories based on the layup sequence,
cause the first robot or the first robot arm to conform the prepreg layer or sheet onto the mold based on the plurality of trajectories, and
cause the second robot or the second robot art to hold or grasp the prepreg layer or sheet based on the one or more grasp locations.

9. The robotic system of claim 8, wherein the one or more processors are configured to generate the plurality of trajectories further based on the one or more grasp locations.

* * * * *